(No Model.)

O. G. WILSON.
FISHING FLOAT.

No. 261,505.  Patented July 18, 1882.

WITNESSES:
W. W. Hollingsworth
W. Read

INVENTOR:
O. G. Wilson
BY
ATTORNEYS.

UNITED STATES PATENT OFFICE.

OLIVER G. WILSON, OF GALLATIN, TENNESSEE.

FISHING-FLOAT.

SPECIFICATION forming part of Letters Patent No. 261,505, dated July 18, 1882.

Application filed April 6, 1882. (No model.)

*To all whom it may concern:*

Be it known that I, OLIVER GRANDERSON WILSON, of Gallatin, in the county of Sumner and State of Tennessee, have invented a new and useful Improvement in Fishing-Floats; and I do hereby declare that the following is a full, clear, and exact description of the same, reference being had to the accompanying drawings, forming part of this specification, in which—

Figure 1:
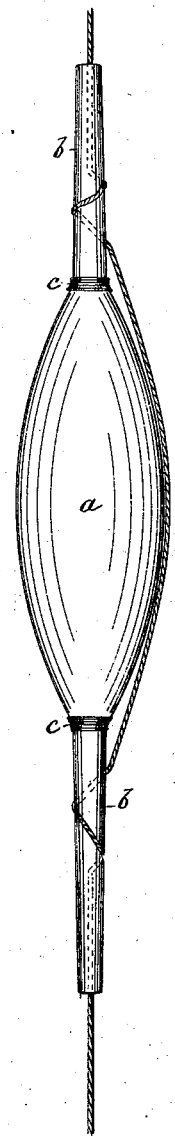
Figure 2:
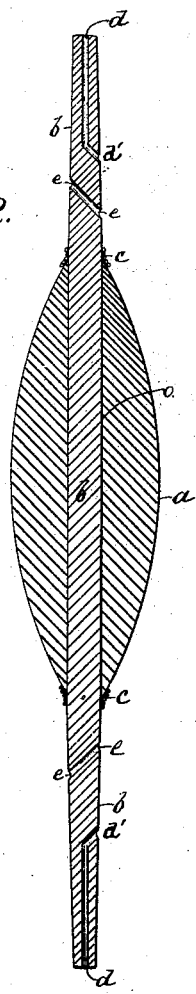

Figure 1 is an elevation of my improved fishing-float. Fig. 2 is a vertical section of the same.

My invention relates to improvements in fishing-floats; and it consists in the peculiar construction and arrangement of the parts, as hereinafter more fully set forth.

In the accompanying drawings, $a$ represents the body of the float, which may be made of cork, wood, or any other desirable light material or composition, and is provided with a central longitudinal opening, $o$, extending its entire length, or only to such distance as desired.

$b$ represents the stem, which may be made preferably of some suitable hard wood in order to insure strength and durability. The stem, however, may be made of other suitable material or composition, and may be formed in one solid piece, or in sections, as desired, and is inserted in the opening $o$ in the body, with its ends projecting equal or unequal distances above and below the body.

$c\ c$ represent wraps, made of suitable strong thread, used to connect the ends of the body with the stem and to insure protection to the tapered ends of the body when frail material like cork is used. The wraps $c\ c$ are wound around the tapered ends of the body, bringing and holding them firmly to the stem.

$d\ d$ represent stem-guide holes made longitudinally in the opposite ends of the stem. These holes are made by drilling longitudinal holes into the ends of the stem to a suitable distance toward its middle, and then drilling counter-holes $d'$ from the exterior of the stem a short distance from its ends toward its middle, and thence outward toward its ends to meet the longitudinal holes first made in its ends. These stem-guide holes $d\ d'$ are made in the end of the stem to such a distance as to insure against breaking or rapid wearing, and also to produce a certain amount of friction on the line.

$e\ e$ represent friction-holes formed by drilling diagonally through the stem above and below the body and between it and each stem-guide hole, the function of which holes is to produce still further friction on the line passing through said holes. The function of these holes or passages in the stem of the float is to properly place or string the float upon the line, and, further, to prevent the float from slipping or moving when the line is suddenly jerked when the bait is taken. The line is passed through the upper stem-guide hole $d$ and out at its lower end. The stem is then turned half around, and the line is passed through the friction-holes $e\ e$, and thence downward over the body of the float, and thence through the friction-holes $e\ e$ in the lower end of the stem, and thence through the lower stem-guide hole $d$ out of the float. The stem-guide holes $d$ may be drilled into the stem to any depth and out at any side of the stem, and so also for the friction-holes $e$.

A float thus constructed can be more easily and securely placed upon and held in position on the line than the floats in use, and when the line and float are in the water, and wet, the wood and line in swelling produce a sufficient friction to prevent the float from moving on the line when a sudden pull is made. This friction, however, is not so great as to prevent the angler from adjusting the float on the line, as desired, to suit the depth of water. The line, in passing out of the float at the upper end of the stem, allows the former to set perpendicular on the water, and the line is held up and out of the way of the sides of the stem, so that while the float may be turning around on the water the line will not be wrapping around the stem and tangling upon it. By passing the stem entirely through the body and wrapping the latter to the stem the strength and durability of the float are greatly increased.

These floats may be made of any shape or size and painted of any desired color.

What I claim as my invention, and desire to secure by Letters Patent, is—

The combination, with the body $a$, of the stem $b$, provided at each end with the stem-guide holes $d\ d'$ and friction-holes $e\ e$, substantially as described, and for the purpose set forth.

OLIVER GRANDERSON WILSON.

Witnesses:
J. H. McLANE,
R. T. CRENSPIN.